United States Patent [19]

Smith

[11] Patent Number: 5,418,565
[45] Date of Patent: May 23, 1995

[54] CFA COMPATIBLE RESOLUTION REDUCTION IN A SINGLE SENSOR ELECTRONIC CAMERA

[75] Inventor: Craig M. Smith, Rochester, N.Y.

[73] Assignee: Eastman Kodak Company, Rochester, N.Y.

[21] Appl. No.: 196,603

[22] Filed: Feb. 15, 1994

[51] Int. Cl.⁶ .................. H04N 9/07; H04N 5/225
[52] U.S. Cl. .................. 348/273; 348/233; 358/909.1
[58] Field of Search ........... 348/266, 272, 273, 233; H04N 9/07, 9/083, 5/225; 358/906, 909.1

[56] References Cited

U.S. PATENT DOCUMENTS

| | | | |
|---|---|---|---|
| 3,971,065 | 7/1976 | Bayer | 358/41 |
| 4,779,135 | 10/1988 | Judd | 348/565 |
| 4,876,590 | 10/1989 | Parulski | 358/41 |
| 5,138,459 | 8/1992 | Roberts et al. | 348/233 |
| 5,164,831 | 11/1992 | Kuchata et al. | 348/232 |
| 5,166,987 | 11/1992 | Kageyama | 382/56 |
| 5,189,526 | 2/1993 | Sasson | 358/432 |

OTHER PUBLICATIONS

U.S. Ser. No. 085,516, filed Jun. 30, 1993; entitled "Single Sensor Color Camera with User Selectable Image Record Size"; Inventors: Kenneth A. Parulski, Richard M. Vogel; Seishi Ohmori.

Primary Examiner—James J. Groody
Assistant Examiner—Cheryl Cohen
Attorney, Agent, or Firm—David M. Woods

[57] ABSTRACT

An electronic camera is adapted for processing images of different resolution to provide a user selectable image record size. A buffer memory is provided for storing color image pixels from a sensor corresponding to at least one image. Processing responsive to a resolution mode switch controls the order in which color image pixels are selected for output storage in both vertical and horizontal directions. The order selected by the resolution switch includes a full resolution mode, and at least one reduced resolution mode in which the low resolution color image pixels are calculated to exactly replicate the pixel geometry of the original CFA image. This simplifies the image processing for the rest of the imaging chain because the same algorithms can be used regardless of the selected image resolution.

16 Claims, 6 Drawing Sheets

$$G' = \frac{G_0 + G_1 + G_2 + G_3}{4} \quad R' = \frac{R_0 + R_1 + R_2 + R_3}{4} \quad B' = \frac{4B_0 + B_1 + B_2 + B_3 + B_4}{8}$$

*FIG. 1*

(PRIOR ART)

*FIG. 2A*

(PRIOR ART)

*(PRIOR ART)*

CFA COMPATIBLE RESOLUTION REDUCTION IN A SINGLE SENSOR ELECTRONIC CAMERA

FIELD OF INVENTION

This invention relates to the field of electronic imaging, and, in particular, to an electronic still camera providing image capture at a plurality of resolution levels.

BACKGROUND OF THE INVENTION

Figure 1:
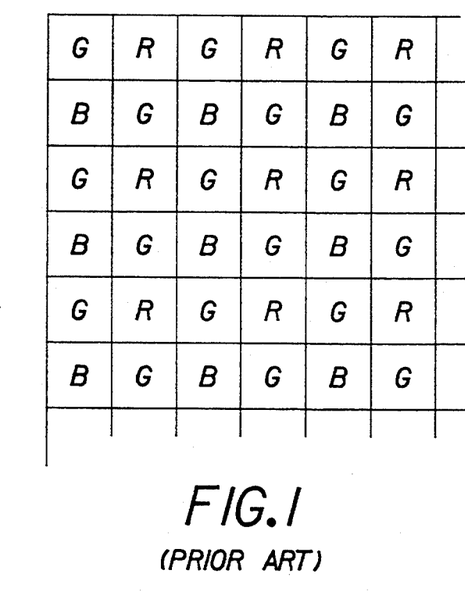
FIG. 1 is a diagram of the Bayer color filter array pattern as known in the prior art.

In the practice of electronic color imaging, it is desirable to simultaneously capture image data in sets of three color planes, usually red, green, and blue. When the three color planes are combined, it is possible to create a high-quality color image. Capturing these three sets of image data can be done in a number of ways. Ideally, three separate two-dimensional image sensors would be used, each capturing one color plane. However, in the interest of conserving space and cost, as well as minimizing complexity, image data in three colors is ordinarily captured with a single two-dimensional sensor; such a sensor includes an array of photosensitive pixels that are covered by a pattern of red, green, and blue filters. This type of filter pattern is known as a color filter array (CFA), and the resulting image is referred to hereafter as a CFA image. FIG. 1 shows how the red (R), green (G), and blue (B) pixels are commonly arranged in a CFA pattern on the surface of an image sensor. The illustrated pattern is the well known Bayer array, which is described in U.S. Pat. No. 3,971,065, incorporated herein by reference. In particular, note that each photosensitive pixel produces a single color signal.

When a CFA image is obtained from a sensor using a CFA pattern, it is therefore necessary to interpolate the missing red, green, and blue values so that there is an estimate of all three color values for each pixel location. Once the interpolation is completed, each pixel is associated with three color values and therefore can be processed by a variety of known image processing techniques, depending on the needs of the system. Some examples of such processing include image sharpening, color correction, or halftoning.

Figure 2A:
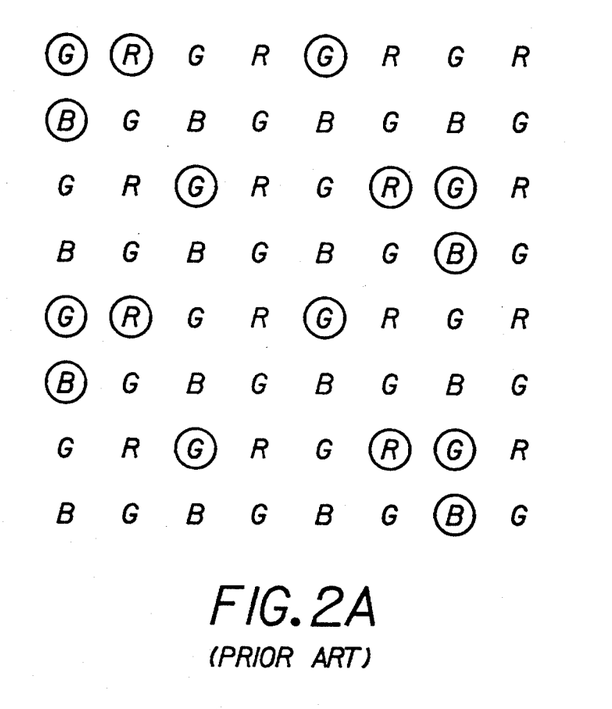
FIGS. 2A and 2B are diagrams of known subsampling patterns that can be applied to the Bayer array shown in FIG. 1.

An electronic camera of this type is described in patent application Ser. No. 085,516, entitled "Single Sensor Color Camera with User-Selectable Image Record Size", filed Jun. 30, 1993 in the name of the same assignee as the present application. Furthermore, application Ser. No. 085,516 describes an electronic camera adapted for processing images of different resolution in order to provide a user selectable image record size. A buffer memory is provided for storing color image pixels from a sensor, and a timing controller responsive to a resolution mode switch controls the order in which color image pixels are selected for storage in both vertical and horizontal directions. The order selected by the resolution mode switch includes a full resolution mode, and at least one reduced resolution mode in which the color image pixels are subsampled. FIG. 2A shows an example of one such low-resolution pattern, with a circle surrounding each sampled pixel.

Figure 2B:
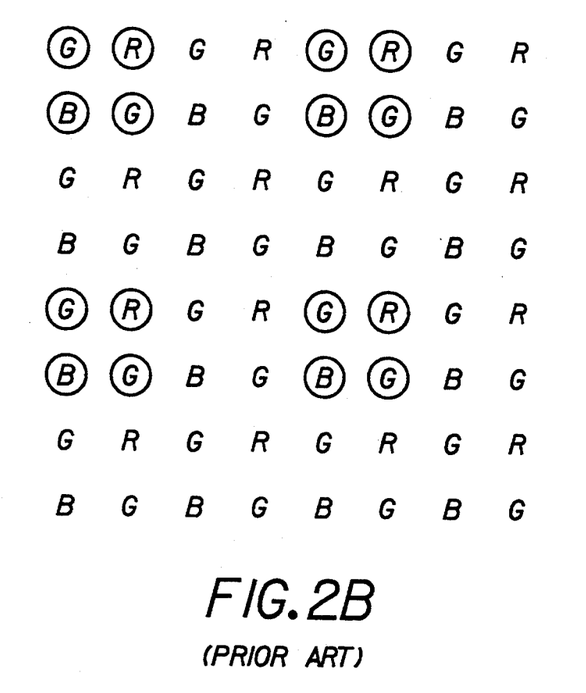

The electronic camera described in Ser. No. 085,516 is capable of storing full resolution CFA images or reduced resolution images, or a combination of images of the different resolutions. Though several methods of generating the low resolution image are described, all of the methods have the same disadvantage. They all create a low resolution CFA image that is spatially different from the original CFA image. Even in FIG. 2B, which shows another low resolution CFA image, the red pixels and the blue pixels are not centered with respect to the green pixels. Consequently, interpolated low resolution pixels are calculated using pixels that are not centered in the same geometric pattern as the original CFA image. This happens because it is difficult to find a subsampling pattern for the Bayer array that would replicate the geometric spacing of the original CFA pattern, at least for moderate levels of resolution reduction. The shifted geometry of the reduced resolution pixels has the following disadvantages.

1. The CFA interpolation is designed for the full resolution CFA geometry. If the interpolation is applied to the shifted geometry of the low resolution pixels, e.g. as shown in either FIG. 2A or FIG. 2B, it will cause artifacts in the image. To avoid this, it is necessary to implement a separate, and typically more complicated, interpolation algorithm.

2. If the image is stored in a compressed form, the compression algorithm may not be optimal for the low resolution pixel geometries. This can cause the compression algorithm to compress at a higher bit rate or lower quality. For example, unwanted color shadows and color fringing can show up in the subsequently decompressed image.

3. If further resolution reduction is necessary, each new reduction shifts the geometry again, so that new interpolation algorithms must be designed.

SUMMARY OF THE INVENTION

The present invention is directed to overcoming one or more of the problems set forth above. Briefly summarized, according to one aspect of the present invention, an electronic camera adapted for capturing and processing images of different resolution includes an image sensor, means for generating an image signal, means for selecting one of a plurality of resolution levels, and a processor for producing a reduced resolution image. The image sensor includes a two-dimensional array of photosites covered by a pattern of chrominance and luminance color filters, and generates an image signal corresponding to a two-dimensional image captured by the sensor. The plurality of resolution levels provide a full resolution image arranged according to the pattern of color filters, and at least one reduced resolution image. The processor produces the reduced resolution image by averaging areas of the captured image to produce a reduced resolution image arranged according to a pattern that replicates the pattern of color filters seen in the full resolution image.

The advantageous effect of the invention is that image processing algorithms designed for full resolution CFA images can also be used on reduced resolution CFA images. More specifically, compression and interpolation algorithms that necessarily make assumptions about CFA geometrics in their methodologies do not have to be redesigned to handle low resolution images.

BRIEF DESCRIPTION OF THE DRAWINGS

The prior art and the invention will be described in relation to the drawings, in which.

DESCRIPTION OF THE PREFERRED EMBODIMENTS

Since electronic still cameras employing a single color sensing device are well known, the present description will be directed in particular to elements forming part of, or cooperating more directly with, apparatus in accordance with the present invention. Elements not specifically shown or described herein may be selected from those known in the art.

Figure 3:
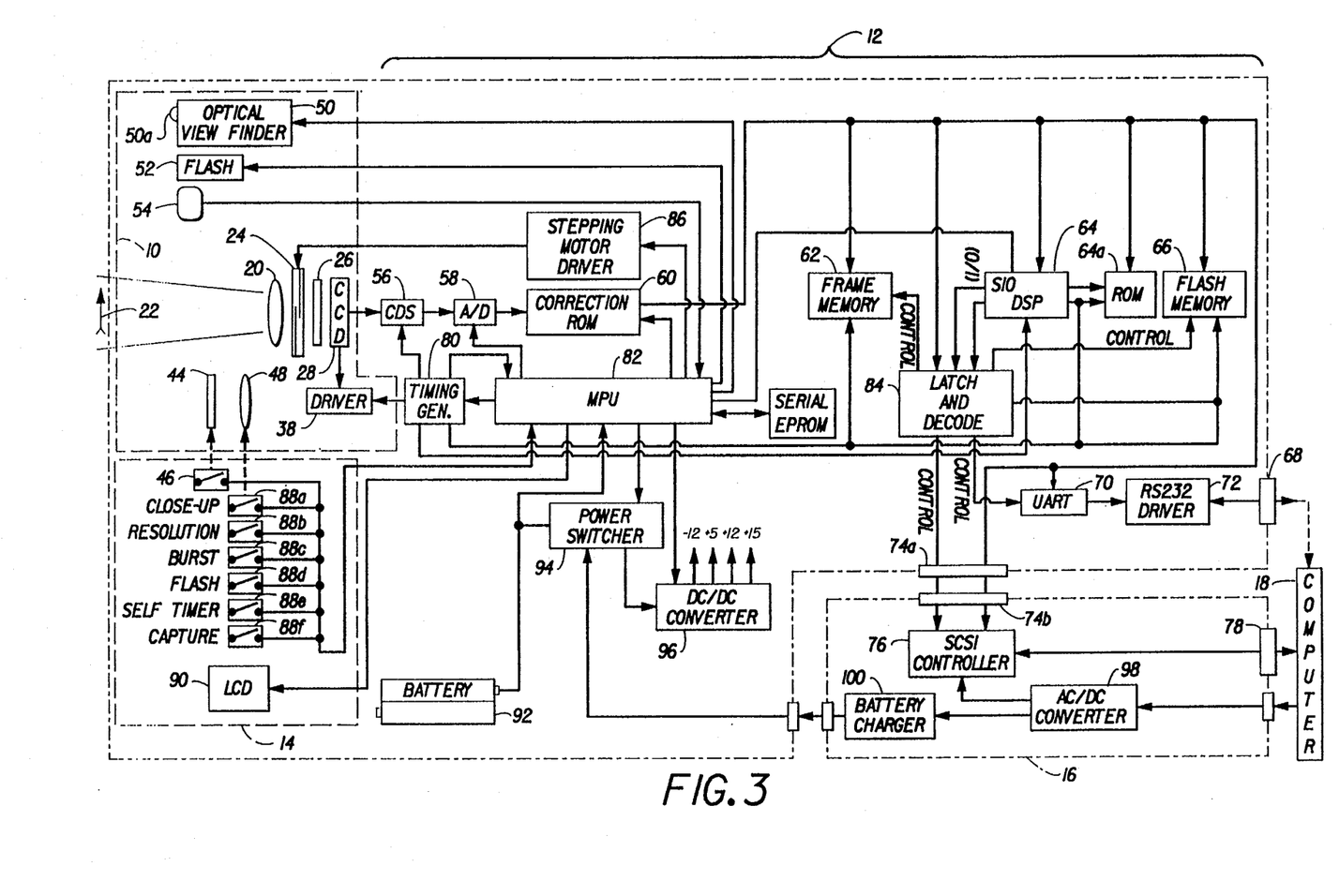
FIG. 3 is a block diagram of a single sensor color camera with CFA compatible resolution reduction in accordance with the invention.

Referring to FIG. 3, the elements of a single sensor electronic camera are shown in block form. The camera is divided generally into an input section 10 for receiving image light and capturing an image, a processing and storage section 12 for processing and storing captured images, a control and display section 14 for user interface with the camera, and a detachable docking unit 16 for transferring stored images from the processing and storage section 12 to a host computer 18. The camera shown in FIG. 3 is sometimes referred to as a dockable electronic still camera, since it relates to the computer 16 generally through the docking unit 16 (although, as will be described, a serial port is provided on the camera body itself for direct connection with the computer 18).

Figure 4:
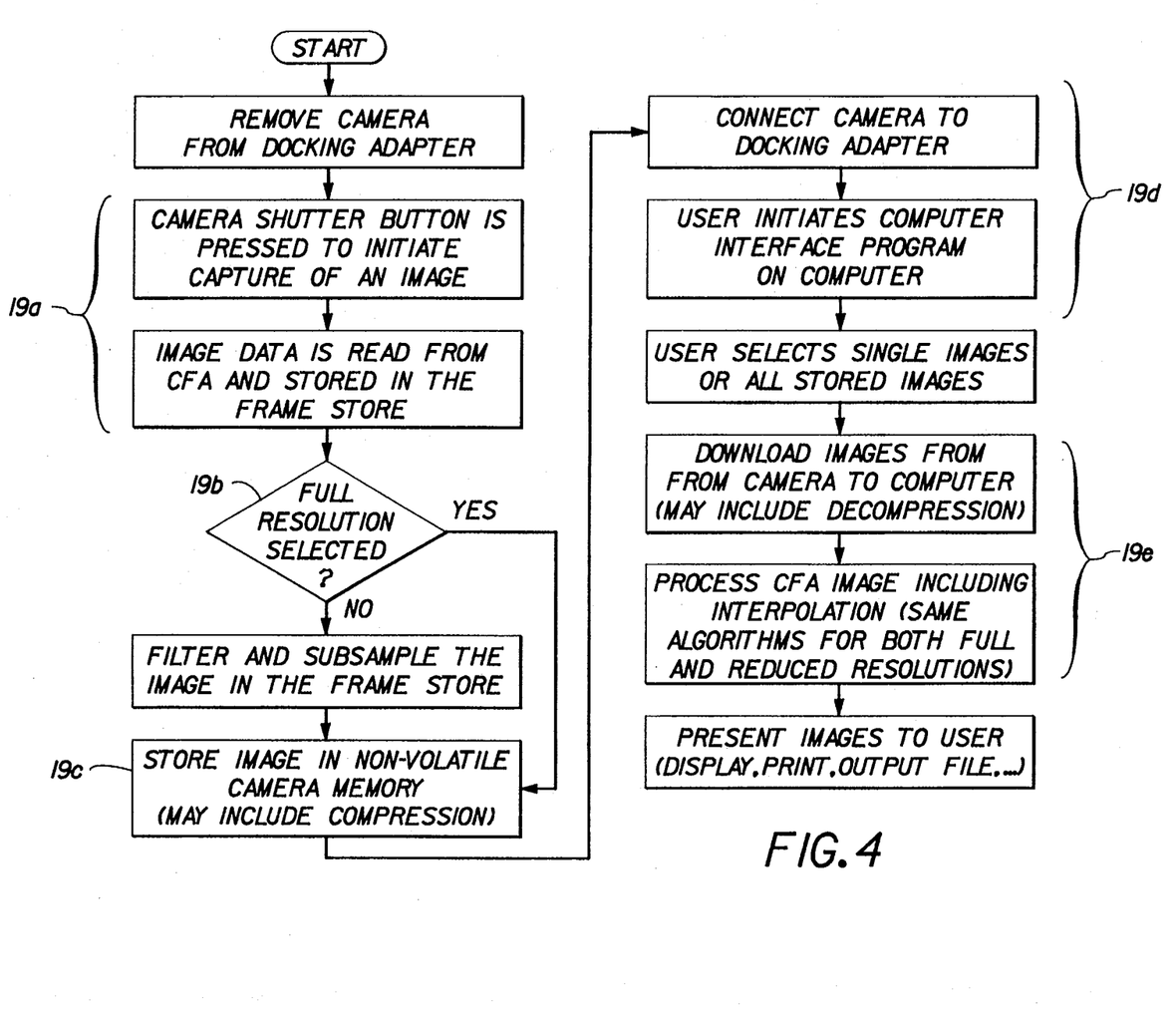
FIG. 4 is a flowchart showing the operation of the camera shown in FIG. 3.

The operation of the camera is generally shown in FIG. 4. With this type of imaging system, the camera is generally removed from the docking unit 16 and used at a location significantly remote from the computer 18. The camera is periodically returned to the computer, and images are then downloaded through the docking unit 16 (or the serial port) to free up the camera memory for more photographs. Because it is often inconvenient for the user to return to the computer to download images, the camera provides the user with the option to store some, or all, of the images at less than the highest resolution level, so that more images may be stored in the camera memory before having to return to the computer 18 to download the images. The purpose of the invention is to filter and subsample a CFA image for a lower resolution in a way that maintains the original CFA geometry. After an image is captured and stored in the camera's frame store (section 19a), the desired resolution level is checked in section 19b. If a lower resolution is selected, the camera filters and subsamples the pixel data according to the technique of the invention (later described), and stores the resultant low resolution image in its nonvolatile memory in section 19c. Such storage may include compression. One advantage of the invention is obtained at this point, namely, that the compression algorithm designed for the full resolution image can also be used in the section 19c on the reduced resolution image. After all images are captured in section 19d, the camera is connected to the docking adapter and the interface is initiated through the computer 18 (by appropriate software, which is not part of this invention). Another advantage of the invention is obtained at this point, where the same decompression and interpolation algorithms designed for the full resolution image can also be used in the section 19e on the reduced resolution image. The desired images are selected, and perhaps previewed, through the computer 18, and accordingly downloaded to its resident memory.

Figure 5:
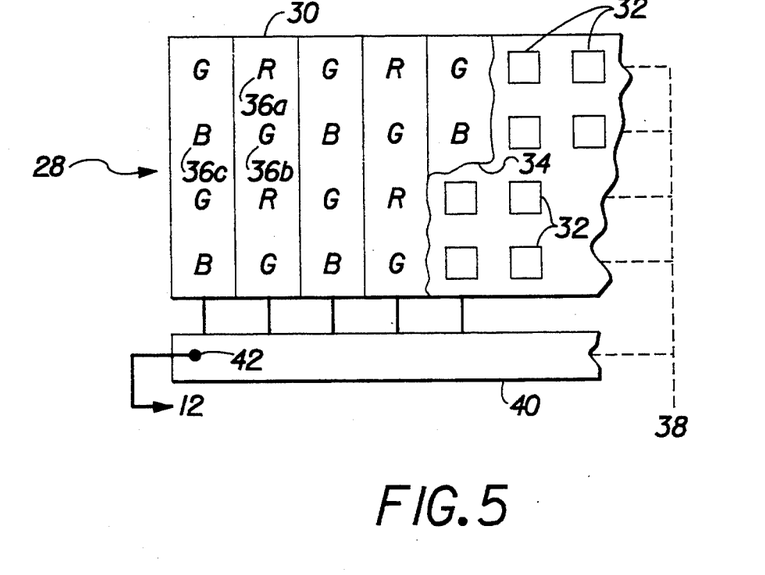
FIG. 5 is a view of a portion of the sensor shown in FIG. 3.

Referring to FIG. 3, the input section 10 includes a lens 20 for imaging light from an object 22 through a shutter and aperture control 24 and an optical low pass filter 26 upon a charge-coupled device (CCD) image sensor 28. The sensor 28 is shown in further detail in FIG. 5 to include a color filter array 30 overlying an array of photosites 32 (shown for illustration through a cut-away portion 34 of the color filter array 30). The color filter array 30 has a plurality of red, green, and blue elements 36a, 36b, and 36c arranged in a predetermined geometrical arrangement, in this case the familiar "Bayer array" described in U.S. Pat. No. 3,971,065, which is incorporated herein by reference. A characteristic of one form of the "Bayer array" is that the luminance picture elements (pixels), i.e., corresponding to the green element 36b, are arranged horizontally and vertically in a checkerboard pattern, and the chrominance pixels, i.e., corresponding to the red and blue color elements 36a and 36c, are each vertically and horizontally adjacent to a luminance pixel. A driver 38 (shown in FIG. 3) generates clocking signals for controlling the image integration time and the vertical transfer of image pixels to a high speed horizontal register 40 (shown in FIG. 5). An output capacitive node 42 produces a signal which is amplified, processed, and stored in the processing and storage section 12.

The input section 10 further includes a lens cap 44 connected to a main switch 46 that activates the camera when the cap 44 is moved to expose the lens 20 to image light, and a close-up lens 48 that can be optionally moved into the path of image light for close-up exposures. The input section also includes an optical viewfinder 50 for framing the object 22 in relation to the sensor 28, a flash unit 52 for illuminating the object 22, and a photocell 54 for converting image intensity information into an electrical signal that is used in the processing and storage section 12 to regulate the shutter and aperture control 24.

The processing and storage section 12 includes a correlated double sampling circuit 56 for providing analog image samples to an analog-to-digital (A/D) converter 58. The digitized signals are corrected for white balance, gamma, and other conventional distortions by a correction read-only memory (ROM) 60, which provides output signals that are applied to a frame buffer memory 62, which is a dynamic random-access memory (RAM). The buffered image signals are processed, e.g., compressed, in a digital signal processor (DSP) 64 and then stored in an output memory, such as flash electrically programmable read-only memory (EPROM) 66. When the camera is to send image data to the computer 18, one of two data paths are used. A serial path from the flash EPROM memory 66 to a serial port 68 is provided through a universal synchronous/asynchronous receiver/transmitter (UART) 70 and an RS232 driver 72. Alternatively, a faster parallel path is provided through connectors 74a and 74b via a small computer systems interface (SCSI) controller 76 in the docking unit 16 to a parallel port 78.

A timing generator 80 provides timing signals to the aforementioned elements in the processing and storage section 12, in particular providing timing input to a microprocessor controller 82 and address timing to the frame buffer memory 62, the DSP 64, the flash EPROM memory 66, and a latching and decoding circuit 84. The microprocessor controller 82 in turn controls the A/D converter 58, the correction ROM 60, the flash unit 52, and a stepping motor driver 86, which controls operation of the shutter and aperture control 24. The microprocessor controller 82 also controls a display element 50a in the viewfinder 50 (for indicating flash ready, under/over exposure, and the like), and receives exposure data from the photocell 54.

While the processing and storage section 12 automatically controls image exposure upon the CCD sensor 28 by means of data input from the photocell 54, a plurality of switches are provided in the control and display section 14 for manually activating a variety of additional features. (Some switches directly activate the respective features, while other switches activate a menu of choices on a liquid crystal display (LCD) 90.) For instance, a switch 88a moves the close-up lens 48 into position, a switch 88b allows the user to select which of two (high or low) different resolution levels of sensor data are stored in the flash memory 66, a switch 88c activates a low resolution "burst" mode in which several pictures are rapidly taken, a switch 88d activates the flash unit 52, and a switch 88e activates a self-timer delay mode. A capture switch 88f initiates each exposure. The liquid crystal display (LCD) 90 indicates the selected feature values. Depending upon the capabilities of the camera, further input may be provided, e.g., levels of compression (number of bits) may be selected, and the color mode (black/white or color) may be designated.

A battery 92 provides power to the camera through a power switcher 94 and a DC/DC converter 96 when the camera is disconnected from the docking unit 16. When the docking unit 16 is connected between the computer 18 and the camera, the computer supplies power to an AC/DC converter 98 in the docking unit 16, which in turns powers a battery charger 100 that connects to the camera and charges the battery 92.

In using the camera according to the invention, activation of the capture switch 88f allows the camera to capture an image, which is then stored in the flash EPROM memory 66, together with other images, until they can be downloaded to the computer 18. The image which is read out from the sensor 28 has, in one embodiment, a total of 512 lines and 768 pixels per line. Since the sensor 28 incorporates a "Bayer" color filter pattern, the digitized values from the A/D converter 58 correspond to values from the various color elements 36a, 36b, 36c on the sensor 28. As an example, eight bit digital pixel values are read from the CCD sensor 28 via ROM 60 at relatively high readout rate and stored in the dynamic RAM frame buffer memory 62. The image signals are then read from the frame buffer memory 62 at a relatively slower speed, compressed using a differential pulse code modulation (DPCM) algorithm (which compresses the image from 8 bits per pixel to 3 bits per pixel) implemented in the DSP 64 pursuant to instructions stored in a program ROM 64a, and stored in the flash EPROM memory 66, which can hold several compressed images. This process typically takes about 4 seconds, which means that full resolution images can only be stored in the flash EPROM memory 66 every 4 seconds. The use of the buffer memory 62 allows the DSP 64 to operate at a throughput rate different from the CCD sensor 28. The aforementioned latching and decoding circuit 84 accomplishes this separation of throughput rates by coordinating the requirement of the DSP 64 with control of the frame buffer memory 62 and the flash EPROM memory 66.

The camera includes the switch 88b which allows the user to select the image record size, that is, which of (at least) two different resolution levels of sensor data are stored in the flash memory 66. When the switch 88b activates the "low resolution" mode, the controller 82 directs the digital signal processor 64 to initiate processing and output of, e.g., a quarter size image. This quarter size image is then compressed by the DSP 64, and stored in the flash EPROM memory 66. It is thus possible to store four times as many low resolution images as high resolution images in the flash memory 66. In order to form the quarter size images, a suitable "subsampling" pattern is required. For example, if only every second pixel of every second line was selected for storage in the buffer memory, the image would contain only values of one of the three colors. To provide a color image, the color filter array pixels must be subsampled properly. This subsampling should be done in a manner that maintains good luminance resolution, without introducing false color "aliasing" artifacts.

The improvement obtained by the invention is based on subsampling according to a filtering pattern that generates a low resolution image that replicates the pixel geometry of the original CFA image-in this embodiment, a low resolution image with the same checkerboard geometry as the original Bayer CFA image. This simplifies the image processing for the rest of the image chain because the same algorithms can be used regardless of the selected image resolution. By using the filtering and subsampling patterns described in this invention, it is possible to use one set of image processing routines to process the image in the host computer. This makes implementation and maintenance of the image processing function much simpler.

Figure 6:
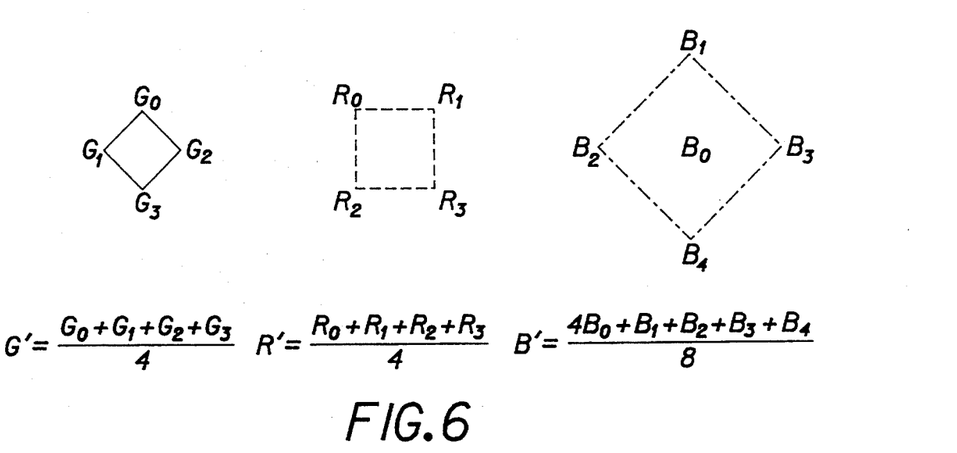
FIG. 6 shows diagrams of the pixel locations (filter patterns) used in the disclosed algorithms to generate low resolution pixels.
Figure 7:
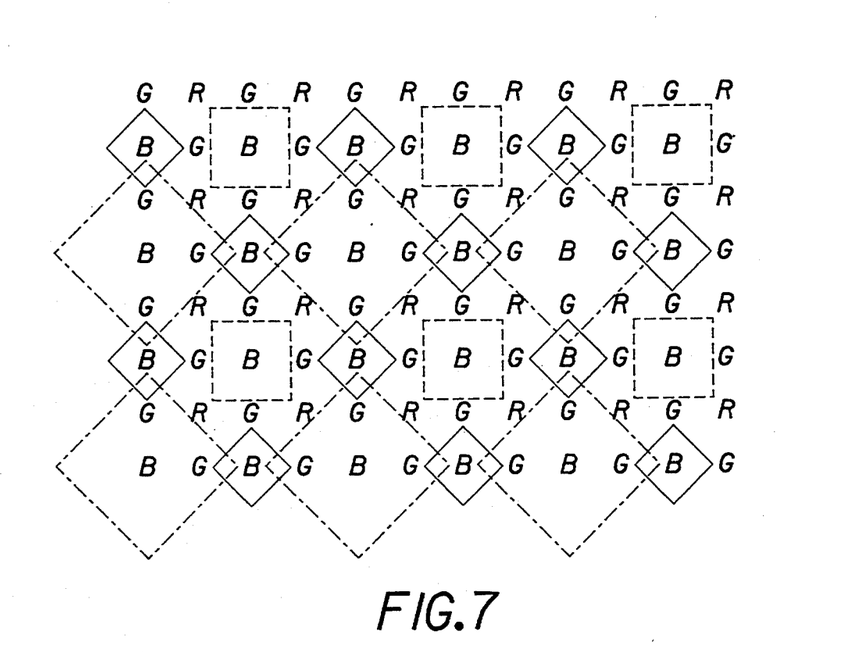
FIG. 7 is a diagram showing how the filter patterns of FIG. 6 are applied to the original, high resolution image.
Figure 8:
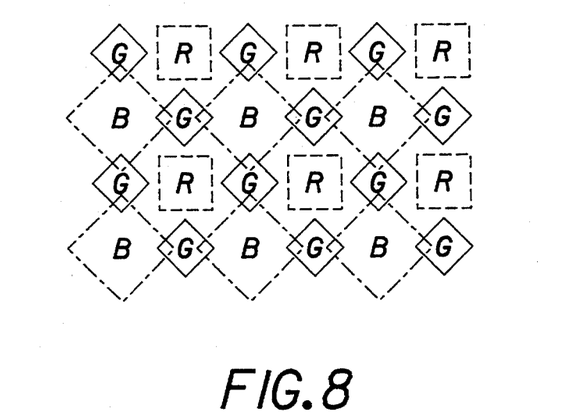
FIG. 8 is a diagram showing the geometrical regularity of the low resolution CFA geometry resulting from the processing shown in FIG. 7.

There are several methods of implementing a resolution reduction algorithm that will proportionately replicate spatial arrangement of the original CFA geometry. The currently preferred embodiment of this invention generates low resolution pixels as a linear combination of pixels in an area around the desired low resolution pixel location. FIG. 6 shows the patterns of the surrounding pixels that are used to calculate a low resolution pixel centered in each pattern for each of the colors, as well as the equations for calculating the low resolution pixel values. To generate a low resolution image with CFA compatible geometry, the filtering patterns shown in FIG. 6 are applied to the original CFA image as shown in FIG. 7. The resulting low resolution image, after processing is completed in accordance with FIGS. 6 and 7, is shown in FIG. 8 as a lower resolution replication of the original Bayer CFA pattern. Note, in particular, that the original geometric spacing has been preserved.

The equations shown in FIG. 6 that are used to filter the image in the preferred embodiment are designed so that all of the coefficients are powers of two. This allows for easy implementation in many digital systems. Other sets of coefficients could easily be used in these equations. To further reduce implementation complexity, some of the coefficients, especially in the red and blue channels, could be set to zero. If more complexity is possible, the coefficients could be set to any real numbers. As long as the resulting low resolution image has the same geometry as the original CFA image, it is within the scope of this invention.

In order to perform the processing indicated by the algorithms illustrated in FIG. 6, the full resolution image is stored in the frame buffer memory 62 in the low resolution mode, and the DSP 64 processes the values from multiple pixels of the same color to form the CFA compatible color subsampled image, by averaging some of the pixels as set out by the algorithms of FIG. 6. The pixels covered by the filter patterns illustrated by FIG. 6 are obtained by suitably programming the microprocessor controller 82 to instruct the digital signal processor 64 to select the appropriate pixel values, and the digital signal processor 64 is itself programmed to perform the respective filter calculations. All such programming is straight-forward and conventional.

The invention has been described in detail with particular reference to a preferred embodiment thereof, but it will be understood that variations and modifications can be effected within the spirit and scope of the invention. For example, while two resolution modes are disclosed in connection with the camera of FIG. 3, the same principles apply regardless of the number of modes. For instance, a third mode could further subsample the pattern of sampled elements to provide a yet lower resolution image. Moreover, other reduced resolution filter patterns may be used, providing that the patterns replicate the original CFA filter geometry. Other CFA patterns may also be used, e.g., based on complementary colors (cyan, magenta, and yellow).

| PARTS LIST | |
|---|---|
| 10 | INPUT SECTION |
| 12 | PROCESSING AND STORAGE SECTION |
| 14 | CONTROL AND DISPLAY SECTION |
| 16 | DETACHABLE DOCKING UNIT |
| 18 | HOST COMPUTER |
| 19a | CAPTURE AND FRAME STORE SECTION |
| 19b | RESOLUTION CHECK SECTION |
| 19c | NONVOLATILE MEMORY SECTION |
| 19d | COMPUTER INTERFACE SECTION |
| 19e | DECOMPRESSION AND INTERPOLATION SECTION |
| 20 | LENS |
| 22 | OBJECT |
| 24 | SHUTTER AND APERTURE CONTROL |
| 26 | OPTICAL LOW PASS FILTER |
| 28 | CCD IMAGE SENSOR |
| 30 | COLOR FILTER ARRAY |
| 32 | PHOTOSITES |
| 34 | CUT-AWAY PORTION OF THE SENSOR |
| 36A | RED COLOR ELEMENT |
| 36B | GREEN COLOR ELEMENT |
| 36C | BLUE COLOR ELEMENT |
| 38 | DRIVER |
| 40 | HORIZONTAL REGISTER |
| 42 | OUTPUT CAPACITATIVE NODE |
| 44 | LENS CAP |
| 46 | MAIN SWITCH |
| 48 | CLOSE-UP LENS |
| 50 | OPTICAL VIEWFINDER |
| 52 | FLASH UNIT |
| 54 | PHOTOCELL |
| 56 | CORRELATED DOUBLE SAMPLING CIRCUIT |
| 58 | A/D CONVERTER |
| 60 | CORRECTION ROM |
| 62 | FRAME BUFFER MEMORY |
| 64 | DSP |

| -continued PARTS LIST | |
|---|---|
| 64A | PROGRAM ROM |
| 66 | FLASH EPROM MEMORY |
| 68 | SERIAL PORT |
| 70 | UART |
| 72 | RS232 DRIVER |
| 74A | CONNECTOR |
| 74B | CONNECTOR |
| 76 | SCSI CONTROLLER |
| 78 | PARALLEL PORT |
| 80 | TIMING GENERATOR |
| 82 | MICROPROCESSOR CONTROLLER |
| 84 | LATCHING AND DECODING CIRCUIT |
| 86 | STEPPING MOTOR DRIVER |
| 88A | CLOSE-UP SWITCH |
| 88B | RESOLUTION SWITCH |
| 88C | BURST MODE SWITCH |
| 88D | FLASH SWITCH |
| 88E | SELF-TIMER SWITCH |
| 88F | CAPTURE SWITCH |
| 90 | LCD |
| 92 | BATTERY |
| 94 | POWER SWITCHER |
| 96 | DC/DC CONVERTER |
| 98 | AC/DC CONVERTER |
| 100 | BATTERY CHARGER |

What is claimed is:

1. An electronic camera adapted for capturing and processing images of different resolution, said camera comprising:

an image sensor having a two-dimensional array of photosites covered by a pattern of luminance and chrominance color filters;

means for generating an image signal corresponding to a two-dimensional image captured by said image sensor;

means for selecting one of a plurality of resolution levels for the image signal, said resolution levels providing a full resolution image arranged according to said pattern of color filters and at least one reduced resolution image; and a processor responsive to a selected reduced resolution level for operating on the image signal by averaging areas of said captured image to produce a reduced resolution image arranged according to a pattern that replicates the pattern of color filters seen in the full resolution image.

2. A camera as claimed in claim 1 wherein said image sensor is covered by a pattern of luminance and chrominance color filters having a predetermined geometrical arrangement, and wherein said processor produces a reduced resolution image arranged according to a pattern that proportionately replicates the predetermined geometrical arrangement of color filters seen in the full resolution image.

3. A camera as claimed in claim 2 wherein the pattern of the reduced resolution image corresponds to pixel locations in the full resolution image that are separated in each dimension by at least one color filter location.

4. An electronic camera adapted for capturing and processing images of different resolution, said camera comprising:

an image sensor having a two-dimensional array of pixels covered by a pattern of luminance and chrominance color filters having a predetermined geometrical spatial arrangement;

means for generating an image signal comprised of pixels corresponding to a two-dimensional image captured by said image sensor;

means for selecting one of a plurality of resolution levels for the image signal, said resolution levels providing a full resolution image and at least one reduced resolution image; and a processor responsive to a selected reduced resolution level for operating on the pixels comprising the image signal by producing a reduced resolution image arranged according to a pattern that replicates the predetermined spatial arrangement of the color filters seen in the full resolution image.

5. A camera as claimed in claim 4 wherein the reduced resolution image comprises a reduced resolution array of processed pixels output by said processor.

6. A camera as claimed in claim 5 wherein said processor operates upon pixels comprising the image signal by averaging pixels surrounding said processed pixel location to produce a reduced resolution image that replicates the predetermined spatial arrangement of the color filters seen in the full resolution image.

7. An electronic camera adapted for capturing and processing images of different resolution, said camera comprising:

an image sensor having a two-dimensional array comprised of pixels covered by a color filter array composed of at least three differently-colored filters arranged in a predetermined geometry;

means for generating an image signal corresponding to a two-dimensional array of color image pixels captured by said image sensor;

means for selecting one of a plurality of resolution levels for the image signal, said resolution levels providing a full resolution image having pixels arranged according to said color filter array and at least one reduced resolution image; and a processor responsive to a selected reduced resolution level for operating on the image signal by averaging image pixels covered by the same-colored filter to produce a reduced resolution image arranged according to a pattern that replicates the predetermined geometry of the color filter array seen in the full resolution image.

8. A camera as claimed in claim 7 wherein said processor produces a reduced resolution image having a pattern of color pixels spatially distributed in a regular way to replicate the predetermined geometry of the color filters seen in the full resolution image.

9. A camera as claimed in claim 7 wherein the color pixels comprising the reduced resolution pattern correspond to pixel locations in the full resolution image that are separated in each dimension by at least one pixel location.

10. A camera as claimed in claim 7 wherein the color filter array is a Bayer array composed of a luminance color filters arranged in a checkerboard separated by two different types of chrominance color filters.

11. A camera as claimed in claim 10 wherein the luminance color filter is a green filter and the chrominance color filters are red and blue filters.

12. An electronic camera adapted for processing images of different resolution, said camera comprising:

an image sensor for generating an image signal representative of color image pixels arranged in vertical and horizontal directions as obtained from a two-dimensional array of photosites covered by a color filter array of luminance and chrominance color filters;

a buffer memory having sufficient capacity for storing the color image pixels corresponding to at least one image;

an output memory, connected subsequent to the buffer memory, for storing processed image signals obtained from the buffer memory;

a resolution mode switch for selecting a pixel resolution of the image by specifying an order in which the color image pixels are selected for storage in both vertical and horizontal directions, said order including a full resolution mode in which all color image pixels are selected and at least one reduced resolution mode in which a fewer number of color image pixels are selected;

a controller responsive to the pixel resolution selected by the resolution mode switch for accordingly changing the number of horizontal and vertical pixels that represent the image, said controller effecting an averaging of the color image pixels for the reduced resolution mode to produce a reduced resolution image arranged according to a pattern that replicates the color filter array of color filters seen in the full resolution image; and means for storing the selected color image pixels in said output memory, whereby said output memory is able to store more images in said reduced resolution mode than in said full resolution mode.

13. A camera as claimed in claim 12 wherein said buffer memory is operable to store all of the color image pixels from said image sensor and wherein said controller effectuates the averaging for the selected pixel resolution by accordingly selecting appropriate pixels from said buffer memory for processing and storage in said output memory.

14. A camera as claimed in claim 13 wherein the color filter array is a Bayer array.

15. A camera as claimed in claim 14 wherein the reduced resolution image is composed of processed color pixels, said controller effecting the averaging of same-colored pixels in the immediate neighborhood of the processed color pixel.

16. A camera as claimed in claim 12 further comprising means for compressing the selected color image pixels, whereby said storing means stores compressed color image pixels in said output memory.

* * * * *